Sept. 1, 1942.   J. D. LANGDON   2,294,785
SIPHON BREAKER AND VALVE
Filed March 25, 1940
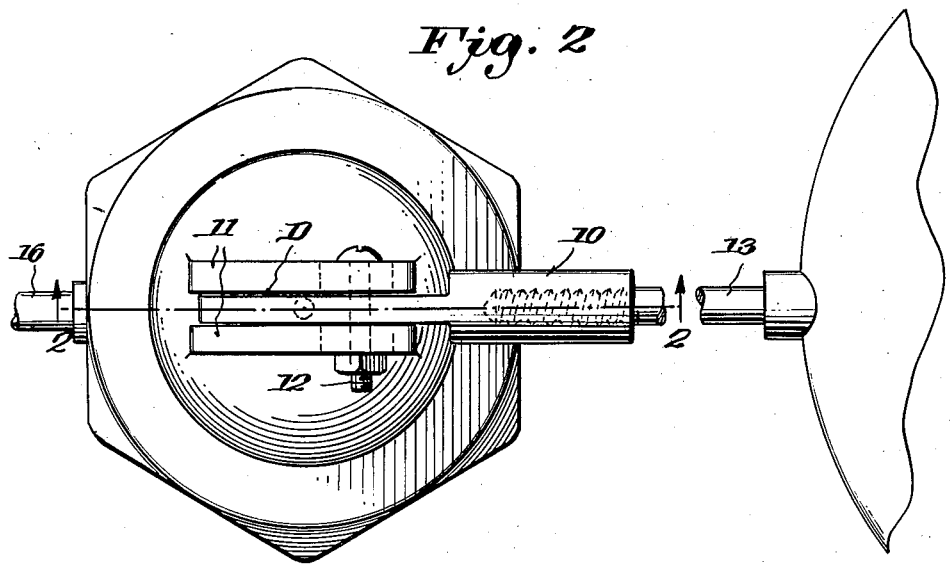
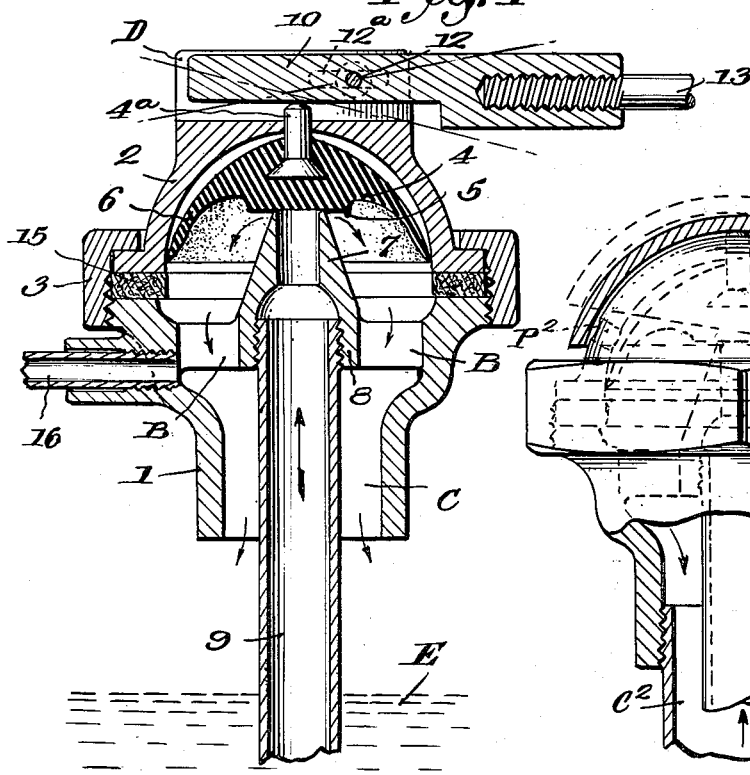
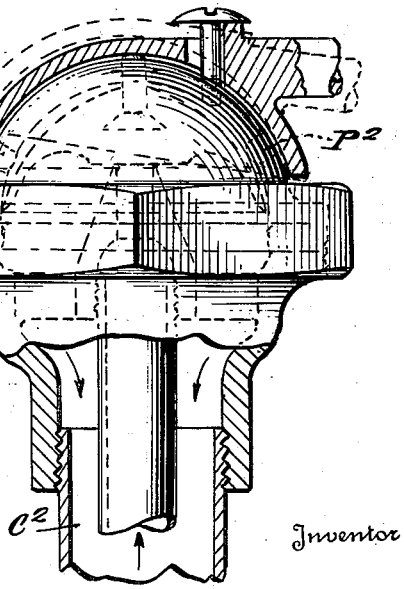
Inventor
J. D. Langdon Patented Sept. 1, 1942

2,294,785

UNITED STATES PATENT OFFICE 2,294,785

SIPHON BREAKER AND VALVE

Jesse D. Langdon, Los Angeles, Calif.

Application March 25, 1940, Serial No. 325,931

3 Claims. (Cl. 137—104)

This application is a continuation in part of Serial No. 294,840, filed September 14, 1939, now Patent No. 2,211,212, granted August 13, 1940.

My invention relates to cocks or valves operated by a hollow float ball, or other similar means, particularly for use in tanks where it is desirable to limit the water level to a predetermined height, and render the valve siphon-proof.

The objects and purposes of my invention are:

First: To devise a simple and economical ball cock to manufacture.

Second: Provide a readily accessible valve unit.

Third: To provide a valve unit wherein the ball lever is adjustable to any position within the range of a full circle with concentric relation to the fixed position of the base attachment of the valve.

Fourth: To provide a maximum of silence by the elimination of prolonged closure noises.

Fifth: The provision of means whereby the outer wall of the standard formed by a supply tube, acts as a guide or conduit to direct the flow of liquid from the valve outlet with a minimum of noise or splashing.

Sixth: To provide a valve member capable of serving the dual purpose of a control valve and sealing means against leakage of fluid above same.

Seventh: To provide a non-siphon valve unit for use in toilet tanks or other tanks liable to contain contaminated fluid.

Eighth: The provision of a valve seat adapted to be self cleaning and sure seating.

Ninth: The organization in a new combination and valve arrangement, of mechanical elements easily adaptable to be conveniently changed from one form of anti-siphon valve to another.

Other and further objects will be disclosed as the description and operation of the invention is set forth by the specifications. It is specifically understood that the form of reduction to practice illustrated by the drawing is for the purpose of illustration and description only, and may be changed within the scope of what is claimed.

Of the drawing:

Figure 1 is a view partly in section of the ball cock assembly, showing the operating lever and valve in closed position, the section being taken along the line 2—2 of Figure 2.

Figure 2 is a top plan view of the invention, illustrating the assembled relationship.

Figure 3 illustrates a modification of the other figures using air vents F operating lever 7a and outlet tube C2.

Identical parts are indicated by similar numbers and characters throughout the drawing.

The structural form and organization of the invention illustrated comprises a base 1 surmounted by a flanged cap 2 held in assembly by a coupling nut 3, a gasket 15 is provided between the flange of cap 2 and top of base 1 to prevent leakage. A bell shaped valve and packer 4 having seating portion 5; surrounded by a flexible flange or skirt 6, is disposed within a concavity or recess in cap 2 and contacts the lower inner circumference of cap 2 with the seat portion 5 normally resting on a conical valve seat 7 which projects upwardly from the floor of base 2; inlet port A is disposed through lug 8 supported by the floor of base 1 which has outlets B—B ported therethrough, the lower end of base 1 being formed funnel shaped with the enlarged portion surrounding lug 8 and its restricted outlet portion converging just below the shoulder formed by lug 8 into which is disposed the inlet or supply tube 9; the base 1 converging to form a restricted outlet C around tube 9.

A valve operating lever 10 is provided lying in a slot D formed by two walls 11—11 extending across the top of cap 2. A fulcrum pin 12 is disposed through elongated adjusting slots 12 in walls 11 and lever 10 which rides the top of stem 4a imbedded in and integral with valve 4. The ball float rod 13 may be attached to any suitable float to operate lever 10.

When put in operation and disposed in a suitable tank, liquid is supplied through tube 9 which serves as a standard to support the valve; the tank being empty the liquid under pressure passes through inlet A, raises valve 4, passes through outlet ports B—B, thence down around supply tube 9 which serves as a guide or conduit to conduct the liquid in a smooth stream toward the bottom of the tank, the lug 8 causing the liquid to adhere to and follow the outer wall of tube 9. The flow of liquid is drawn inwardly around the outer wall of tube 9 due to a partial vacuum being created by the aspirating effect of liquid flowing downwardly past the shoulder of lug 8 causing the liquid to converge radially inward against tube 9 and follow the same. The position of the lower end of the lug 8 and the conformity of the funnel shape inside of the base outlet C should approximate the relationship as of the illustration if the liquid is to be held smoothly against tube 9.

The fluid entering against the valve number 4 not only serves to raise it to open position when rod 13 drops, but forces the skirt 6 to expand radially outward effectually sealing against fluid leakage, around member 4, stem 4a or through vents P2 as of Figure 3, the valve 4 being a combination control valve and packer against the egress of fluid through any openings in cap 2.

The lever 10 has a flat elongated portion extended clear across the top of cap portion 2 which lies in the slot D and provides means to prevent the leverage exerted by the ball float via rod 13 from riding the valve stem 4A after the valve 4 is seated, thus limiting the embedment of seat 7 into the relatively soft seating portion 5 of valve 4; on the other hand when the valve 4 is in open position due to the proximity of the lever to the floor of the slot 4 adjacent the outer end of lever 10 said lever 10 is limited in its downward movement so that the float attached to rod 13 is held suspended at a height near to the top of the normal water level when the tank is filled; this arrangement causes the valve to remain fully open during the flow of fluid until a predetermined level is reached when the tank is refilling after being emptied.

Because of this fact the closing interval is very short and the prolonged hissing sound of a slowly closed valve is minimized by using shortest possible closing interval.

Where the invention is used in filling a tank connected with a toilet bowl it is desirable after flushing to refill the bowl with water up to a certain level above the trap ordinarily used in such bowls, therefore a refill tube 15 is provided which takes off from the enlarged part of the funnel portion of base 1 and adjacent one of the outlet ports 3 insuring a generous flow of liquid due to the fact that the tube 15 takes off directly from the point of flow through a port B the refill being further aided by back pressure due to the restriction formed by outlet C.

The modification shown by Figure 3 has a cap lever 10a serving as a cowl to cover air ports P2, which serve to prevent back siphonage of liquid from the tank when vacuum is applied through supply tube 9. Ports P2 are located above the liquid level at all times, just as outlet C is designed to be raised as a siphon breaker, at a safe height above the water level.

In order to make the invention as of Figure 1, siphon proof, the outlet C must be located high enough above an overflow drain provided in a tank which limits the liquid level so that when vacuum is exercised via supply tube 9 and valve 4 is for any reason held open, the air entering outlet C or ports P2 will not aspirate liquid from the surface level of liquid in the tank. The valve 4 acts as a check valve ordinarily and usually the siphon breaking provision of air inlets above the water level would not be required.

Having described the invention and that which is new I claim:

1. A ball cock comprising two halves coupled together, the lower half forming a base the upper half forming a cap, a floor in said base having a valve seat projecting upwardly and a lug for coupling a supply tube opening downwardly therefrom, outlet ports through said floor opening downwardly, into a funnel shaped chamber, a bell-shaped valve member disposed in a barrel formed by the inner wall of said cap; flexible means forming the peripheral edge of said valve member to seal against leakage, a stem extending from said valve member through said cap, said valve member reciprocating in said barrel when raised by fluid pressure which flexes the outer edge of said valve member against the wall of the barrel, said valve member being closed against said seat by a fulcrumed lever attached to the top of the said cap.

2. A valve of the kind described comprising a casing open to atmosphere, and having an inlet and outlet, a domed and flexibly skirted bell shaped valve member adapted to engage the casing wall and having a valve seat disposed within the dome and seating across said inlet, the dome and skirt forming a check valve intervening between the opening to atmosphere and said inlet, and acting to divert water into a refill tube disposed below said inlet, and below the skirt of said valve member, a valve stem projecting upwardly through said casing and being impinged by lever means attached to said casing whereby said valve member may be moved to and from the inlet opening.

3. A valve of the kind described comprising a casing, having a base provided with inlet and outlet ports, an upper portion open to atmosphere, a bell-shaped valve member having a flexible skirt disposed to intervene between said portion open to atmosphere and a central portion forming the valve inlet port, said bell-shaped member suitably formed to provide a seating element across said inlet port, said skirt held in sealing contact with the inner wall of the upper portion by internal fluid pressure, a stem projecting from the valve member and through the upper portion of said casing, said bell shaped member being free to be moved out of contact with the upper portion when pressure within the valve becomes sub-atmospheric, and acting to deflect water downwardly toward a refill tube disposed below ports in a transverse supporting floor disposed across the lower portion of the casing, said floor supporting a valve seat surrounding said valve inlet port, lever means disposed across the stem of said bell-shaped member and adapted for attachment to a float.

JESSE D. LANGDON.